United States Patent Office 3,468,016
Patented Sept. 23, 1969

3,468,016
METHOD AND COMPOSITION FOR IMPROVED WELDING OF LIGHT METAL OR LIGHT ALLOYS
Roger Lorain, Issoire, and Albert Trompier, Paris, France, assignors to Compagnie Generale du Duralumin et du Cuivere "Cegedur," Paris, France
No Drawing. Filed Apr. 5, 1966, Ser. No. 540,205
Claims priority, application France, Apr. 7, 1965, 12,243
Int. Cl. B23k 31/02, 29/00
U.S. Cl. 29—488                                            8 Claims

ABSTRACT OF THE DISCLOSURE

The invention relates to a process for producing carbon-free joints preparatory to welding light metal members which are initially coated with a polymer capable of depolymerization to produce a gaseous monomer at welding temperature and thereafter heating the members to a welding temperature in an atmosphere free of oxygen and finally welding the members while heated in the atmosphere.

---

This invention relates to a method of protecting light metal or light metal allow members to be welded and welding these metallic members and, more particularly, to an improved method of welding metallic members in an oxygen-free atmosphere.

One object of the present invention is to obtain a welded joint free of residual carbon between metallic members wherein it is unnecessary to clean the protective coating from the metal prior to the welding step.

A second object of the present invention is to provide an improved method of welding whereby stronger joints may be obtained between metallic members of light metals or their alloys.

A further object of the present invention is to provide a composition adapted to protect the members prior to welding by the improved method of this invention.

The manufacturing and construction industries have expended great amounts of time and money to develop improved welding techniques. Recent developments into ultra miniaturization as well as advanced development of light weight materials suitable for use in space and space travel have caused considerable complications due to the unsuitability of present welding techniques. These problems are further complicated by recent trends in industry to produce articles from pre-shaped sheet materials of light alloys, such as aluminum and which are cut, drilled, stamped, bent, transported and stored for extended periods prior to the final assembly into the final structures and articles. It is, therefore, necessary to improve the techniques utilized to prevent corrosion, tarnishing and fretting corrosion of these metallic members not only during the early manufacturing steps and periods of storage, but also during the final assembly which requires welding of such members.

By the U.S. Patent 2,977,458 it is known to use protective compositions including organic nitrogen compounds, alcohols and hydrocarbons. These compositions present suitable properties for protection against corrosion and fretting corrosion more specially for metallic elements to be welded by resistance. However, such compositions cannot be used for welding under atmosphere free of oxygen because hydrocarbons commonly used for protective purposes (oils or fats of mineral, vegetable or animal origin) have at least one common disadvantage, i.e. they decompose during welding under atmosphere free of oxygen, which results in a deposit of residual carbon of the "Conradson" or "Ramsbottom" type remaining on the metallic surface. This residual carbon interferes with the welding of all metals, but particularly light metals and their alloys, even when the welding is conducted in an oxygen-free atmosphere. The joints produced, when such protective coatings are used, are inferior because the residual carbon either renders the welded seam porous as it is oxidized, or prevents the weld from adhering properly to the surface of the metallic members. It was, heretofore, necessary prior to the present welding process in an oxygen-free atmosphere with the novel protective coating, to precede the welding step with operations for degreasing and scraping the metallic members causing a substantial increase in the manufacturing costs and resulting in a finished article having a surface extremely susceptible to corrosion, tarnishing and/or fretting corrosion. The present invention avoids these drawbacks by utilizing a unique protective coating which need not be removed prior to and does not interfere with welding in an oxygen-free atmosphere as well as with resistance welding.

The present invention provides a method of preparing metallic members made of light metals or their alloys having surfaces of good quality which are suitable for welding. These metallic members are coated with a composition containing at least one relatively fluid organic polymer preferably selected from the group consisting of polyisobutylene and polybutylene and at least one compound selected from the group consisting of an organic nitrogen compound and an alcohol, said composition being applied to prevent the deterioration of the surface prior to welding. This coating is applied to the surface of the metallic elements at any time prior to the welding step and need not be removed before welding which is conducted under an oxygen-free atmosphere, as for example, in the presence of argon.

Polybutylene and polyisobutylene have already been used alone for the protection of metals against corrosion and also for lubricating metallic parts. For example, a publication by Guterbock entitled "Polyisobutylene" was published by Springer Verlag in Berlin, Göttingen, Heidelberg, 1959, pages 188–207. This article does not anticipate that combination of these compounds with organic nitrogen compounds or alcohols to present greatly improved protective properties, and which further allows welding with the protective coating in oxygen-free atmosphere and also improves welding by resistance of the metallic members to be protected. During welding in oxygen-free atmosphere, the polymer of the composition is depolymerized thus producing by thermolysis the gaseous monomer from which it was polymerized.

The molecules of the other compounds namely the nitrogen compound and/or the alcohol are carried away by the above-mentioned vaporization so that the metallic surfaces to be welded remain free of residual carbon. Tests have shown that only very minute traces of residual carbon remain on the metal surfaces and that such residues are in the order of 1 part carbon to 10,000 parts of surface material.

Thus, metallic members coated with such materials may be welded under an oxygen-free atmosphere without preliminary degreasing or scraping and the subsequent welded joint does not exhibit porosity or inclusion of residual carbon as a result of the novel properties of this protective composition.

According to the present invention, compositions which have been found suitable for insuring protection prior to the welding and decompose in an oxygen-free atmosphere at welding temperatures without residual carbon deposits contain a mixture of 70 to 99% by weight, and preferably 80 to 95% by weight, of a polymer such as polyisobutylene or polybutylene with the remaining portion of said mixture comprising nitrogen-containing compounds and/or an alcohol having at least 3 carbons.

For example, an oily polybutylene having a relatively low molecular weight in the order of approximately 400 to 2500 and having a viscosity in the order of 7 centistokes at 99° C. with a flow point less than 0° C. has proved very satisfactory. This polymeric compound is sold under the trade name of "Napvis 05," which is manufactured and sold by the French Naphthachimie Company.

Suitable nitrogen-containing compounds for use in the present invention are amines, diamines and organic salts of both amines and diamines. Diamine dioleate has been found particularly suitable.

Because of its low cost isopropylalcohol has been found most satisfactory for the present invention, although alcohols having from 3 to 12 carbons have been found to be satisfactory.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A method for obtaining a welded joint free of residual carbon between light metals or light alloy members which comprises coating said members with a polymer capable of depolymerization by thermolysis to produce the gaseous monomer of said polymer at welding temperatures, heating said members to the welding temperature in an atmosphere free of oxygen and welding said members while heated in said atmosphere.

2. A method for obtaining a welded joint free of residual carbon between light metals or light alloy members which comprises, first, coating said members with a composition of 70 to 99% by weight of a polymer capable of depolymerization by thermolysis to produce the gaseous monomer of said polymer, and a compound selected from the group consisting of amines, diamines, organic salts of amines, organic salts of diamines, and an alcohol having at least three carbons, second, heating the coated members in an atmosphere free of oxygen until said coating is vaporized, and, third, welding said members while in said atmosphere.

3. The method according to claim 1, wherein the atmosphere free of oxygen is an atmosphere of argon.

4. The method according to claim 2, wherein the atmosphere free of oxygen is an atmosphere of argon.

5. The method according to claim 2, wherein the polymer is polybutylene having a molecular weight in the order of 400 to 2500.

6. A method for obtaining a welded joint free of residual carbon between metallic members which comprises coating said members with a composition including a polymer selected from the group consisting of polybutylene and polyisobutylene and a nitrogen compound, heating said members to the welding temperature in an atmosphere free of oxygen and welding said members while heated in said atmosphere.

7. The method according to claim 6, wherein the nitrogen compound is diamine dioleate.

8. The method according to claim 7, wherein the atmosphere free of oxygen is an atmosphere of argon.

References Cited

UNITED STATES PATENTS

| | | |
|---|---|---|
| 2,923,041 | 2/1960 | Ryznar. |
| 2,977,458 | 3/1961 | Tournaire _____ 219—118 |
| 3,217,403 | 11/1965 | Pekar _____ 29—488 |
| 3,325,432 | 6/1967 | Kellert. |

FOREIGN PATENTS 1,270,919  1961  France.

JOHN F. CAMPBELL, Primary Examiner

J. L. CLINE, Assistant Examiner

U.S. Cl. X.R.

29—494